US010971719B2

(12) United States Patent
Claude

(10) Patent No.: US 10,971,719 B2
(45) Date of Patent: Apr. 6, 2021

(54) METHOD FOR MANUFACTURING A BATTERY ELECTRODE WITH DISCONTINUOUS INK COATING

(71) Applicant: COMMISSARIAT À L'ÉNERGIE ATOMIQUE ET AUX ÉNERGIES ALTERNATIVES, Paris (FR)

(72) Inventor: Guillaume Claude, Saint Martin d'uriage (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 217 days.

(21) Appl. No.: 15/904,674

(22) Filed: Feb. 26, 2018

(65) Prior Publication Data

US 2018/0248170 A1 Aug. 30, 2018

(30) Foreign Application Priority Data

Feb. 27, 2017 (FR) ..................... 17 51555

(51) Int. Cl.
*H01M 4/13* (2010.01)
*H01M 4/1399* (2010.01)
(Continued)

(52) U.S. Cl.
CPC ....... *H01M 4/1399* (2013.01); *H01M 4/0404* (2013.01); *H01M 4/0435* (2013.01);
(Continued)

(58) Field of Classification Search
CPC ...... H01M 4/1399; H01M 4/137; H01M 4/62; H01M 4/0404; H01M 4/0435; H01M 4/13; H01M 4/626; H01M 10/0525
See application file for complete search history.

(56) References Cited

U.S. PATENT DOCUMENTS 6,365,299 B1 * 4/2002 Miyaki .................. H01M 4/131
429/218.1
8,492,027 B2 * 7/2013 Uetani .................... H01M 4/13
429/209
(Continued)

FOREIGN PATENT DOCUMENTS

| FR | 3011391 A1 | | 4/2015 |
|---|---|---|---|
| JP | 2004-103474 | * | 4/2004 |
| WO | WO 2015044550 | * | 4/2015 |

OTHER PUBLICATIONS

JP 2004-103474 (Year: 2004).*
French Search Report for FR 1751555 dated Aug. 23, 2017.

*Primary Examiner* — Alexander Usyatinsky
(74) *Attorney, Agent, or Firm* — Pearne & Gordon LLP

(57) ABSTRACT

A method of manufacturing a battery electrode with a discontinuous ink coating, including the following steps: make ink zones (16) on a first longitudinal segment (26a) of a metallic support (22) and at least one additional ink zone (32) on at least one second longitudinal segment (26b) of the support zones (16, 32) jointly forming a support coating arranged such that at least one additional ink zone (32) of a second segment is located laterally facing each recessed zone (40) formed between two directly consecutive ink zones (16) of the first segment (26a); calendering of the metallic support (22) provided with its coating (16, 32), the calendering roll located on the side of the coating being permanently in contact with this coating during calendering; and separation of the segments (26a, 26b) so as to obtain the electrode.

14 Claims, 5 Drawing Sheets

(51) Int. Cl.
*H01M 4/04* (2006.01)
*H01M 10/0525* (2010.01)
*H01M 4/137* (2010.01)
*H01M 4/62* (2006.01)

(52) U.S. Cl.
CPC ............ *H01M 4/13* (2013.01); *H01M 4/137* (2013.01); *H01M 4/626* (2013.01); *H01M 10/0525* (2013.01)

(56) References Cited

U.S. PATENT DOCUMENTS

| | | | |
|---|---|---|---|
| 2007/0187231 A1* | 8/2007 | Tazoe | H01M 4/0404 204/280 |
| 2010/0330267 A1* | 12/2010 | Shimizu | H01M 10/0525 427/77 |

\* cited by examiner

METHOD FOR MANUFACTURING A BATTERY ELECTRODE WITH DISCONTINUOUS INK COATING

CROSS-REFERENCE TO RELATED APPLICATIONS

This application claims priority from French Patent Application No. 17 51555 filed on Feb. 27, 2017. The content of this application is incorporated herein by reference in its entirety.

TECHNICAL DOMAIN

This invention relates to manufacturing of a battery electrode with a discontinuous ink coating.

It is preferably related to electrodes for lithium-ion batteries.

STATE OF PRIOR ART

The electrochemical core of a lithium-ion battery is formed by assembling a negative electrode, a positive electrode and a separator located between these two electrodes. This assembly is arranged inside a sealed casing into which a liquid electrolyte is injected.

Fabrication of the electrodes consists firstly of coating a metal foil with ink, that conventionally comprises constituent ingredients of the electrode, for example such as the active material, a PVDF type polymer binder, a material that conducts electricity, etc.

Once the ink has been deposited on the foil, the assembly is calendered so as to obtain the required characteristics for the electrode, such as the energy density, the porosity, the electrical conductivity, etc. Calendering is done by passing the foil between calender rolls, along a longitudinal direction of the electrode to be fabricated. These rolls are usually driven in rotation, and the foil is moved forwards through the calendering device through contact with the rolls.

The ink coating on the foil is generally continuous. However, there are battery electrodes on which ink must be present in the form of zones at a spacing from each other along the longitudinal direction. In this case, calendering can be difficult because the rolls alternately encounter ink zones and recessed zones during the movement. The spacing between the rolls thus reduces as soon as they come into contact with a recessed zone, which makes it difficult to control the profile of the electrode at the edge of ink zones.

Furthermore, in the case in which the foil is moved forwards by contact with the calendering rolls, the passage through these rolls at the recessed zones of the foil can cause a loss of traction.

To overcome these disadvantages, the ink coating can be applied continuously on the foil before it is calendered, and surplus ink is then removed after the exit from the calendering device. Removal is then done manually using a cotton swab and a solvent, to create ink zones at a spacing from each other. Other techniques are possible, for example laser ablation. In all cases, this additional step to remove some of the ink at the exit from calendering makes the process for manufacturing the electrode significantly more complex.

Thus, there is a need to optimise such an electrode manufacturing process, so as to maintain the quality of the product obtained while being simpler in application.

SUMMARY OF THE INVENTION

To satisfy this need, the first purpose of the invention is a method of manufacturing at least one battery electrode with a discontinuous ink coating, according the characteristics given in claim 1.

The invention thus provides a simple and ingenious solution, to optimise manufacturing of a battery electrode with a discontinuous ink coating. The additional ink zone(s) deposited on the metallic support before calendering prevent(s) sudden reductions in the separation of rolls during calendering. The profile of the electrode at the edge of the ink zones is thus better controlled, without making the manufacturing process more complex. It is sufficient to separate the different segments at the end of calendering to obtain the required electrode, through the first segment. The other second segment(s) can also be reused or recycled, however it is necessary that at least one of them forms another electrode. In other words, the elements used to improve the quality of the required electrode thus themselves form one or several other electrodes, calendered at the same time as the electrode from the first segment.

Furthermore, when the support is advanced by the calendering rolls, providing a permanent contact between the rolls and the support coated with ink avoids jerks and losses of drive of the support during movement.

Finally, note that the inherent principle of the invention can be applied on one of the two opposite surfaces of the metallic support, or preferably on both of its surfaces.

The invention also includes at least any one of the following optional characteristics, taken in isolation or in combination.

According to a first preferred embodiment, at least one second support segment is coated with an additional continuous ink zone along the longitudinal direction of the support. More preferably, two second support segments are located one on each side of the first segment, and each of the two second segments is coated with an additional continuous ink zone along the longitudinal direction of the support.

Thus, after said segment separation step, at least one of the second segments can form another electrode with a continuous ink coating.

According to a second preferred embodiment, at least one second support segment is coated with a plurality of additional ink zones at a spacing from each other along the longitudinal direction of the support. More preferably, there are several second support segments located on each side of the first segment, and each of the second segments is coated with a plurality of additional ink zones at a spacing from each other along the longitudinal direction of the support.

For example, the ink zones and the additional ink zones are staggered on the support, and/or the assembly formed by the ink zones of the first segment is identical to the assembly formed by the additional ink zones of at least one second segment directly consecutive to it along the lateral direction.

Alternatively, the longitudinal extent of the ink zones is different from the longitudinal extent of the additional ink zones of at least one of the second segments, and/or the space between two directly consecutive ink zones is different from the space between two additional directly consecutive ink zones of at least one of the second segments.

Once again, after said segment separation step, at least one of the second segments forms another electrode with a discontinuous ink coating. As for the previous embodiment with a continuous ink coating, each of the second segments preferably forms an electrode.

Furthermore, the support is preferably made from a copper or aluminium based material or by carbon foil.

Preferably and as mentioned above, during the calendering step, the support coated with ink is advanced by contact between the support and the calendering rolls driven in rotation.

Preferably, the thicknesses of the ink zones and of the additional ink zones of the support coating are almost identical.

Preferably and as mentioned above, the other of the two opposite faces of the metallic support is also equipped with the inherent principle of the invention, in that they are coated with ink zones and at least one additional ink zone Finally, another purpose of the invention is a metallic support coated with ink, that will be used to fabricate at least one battery electrode with a continuous ink coating, said electrode being designed to include a metallic foil coated with a plurality of ink zones at a spacing from each other along a longitudinal direction of the electrode on at least one of its two opposite surfaces.

According to the invention, a metallic support is provided on at least one of its two opposite surfaces, coated with:
  ink zones on a first longitudinal segment of the support;
  at least one additional ink zone on at least one second longitudinal segment of the support offset from the first segment along a lateral direction of the support, the ink zones and each additional ink zone jointly forming a support coating arranged such that at least one additional ink zone of a second segment is located laterally facing each recessed zone formed between two directly consecutive ink zones of the first segment.

Furthermore, the assembly formed by the ink zones of the first segment is laterally spaced from the assembly formed by each additional ink zone of at least one second segment directly consecutive to it along the lateral direction.

Other advantages and characteristics of the invention will become clear after reading the following detailed non-limitative description.

BRIEF DESCRIPTION OF THE DRAWINGS

This description will be made with reference to the appended drawings among which;

FIG. 5 is a diagrammatic view of a calendering step used in a manufacturing method designed to obtain the electrode in FIG. 2a;

DETAILED DESCRIPTION OF PREFERRED EMBODIMENTS

Figure 1:
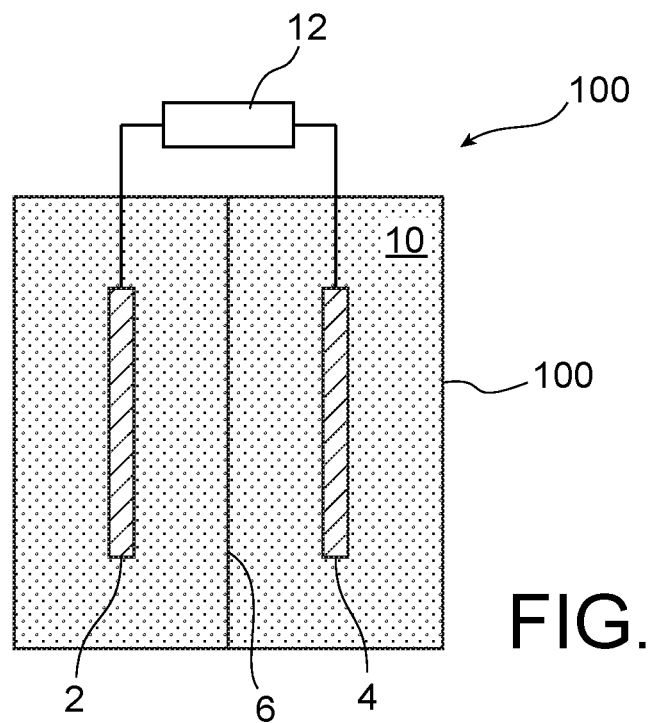
FIG. 1 shows a diagrammatic front view of a lithium-ion battery comprising elements that will be obtained by application of a manufacturing method according to the invention.

FIG. 1 diagrammatically represents a lithium-ion type battery 100, the core of which is formed by the assembly of a positive electrode 2 and a negative electrode 4, between which there is a separator 6. This electrochemical core is placed in a sealed housing 8 that is filled with a liquid electrolyte 10. Furthermore, and in a known manner, the two electrodes 2, 4 are connected to a receiver 12.

The invention aims at manufacturing electrodes 2, 4, that can be manufactured in exactly or approximately the same manner. Consequently, only manufacturing of the positive electrode 2 will be described herein.

Figure 2A:
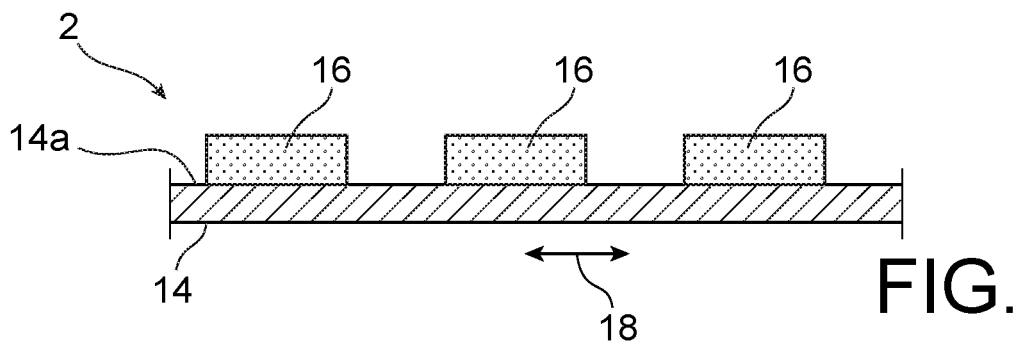
FIG. 2a is a diagrammatic longitudinal sectional view of a battery electrode that will be obtained by application of the manufacturing method according to the invention.

FIG. 2a shows the design of the electrode to be obtained by the method according to the invention in more detail. The electrode 2 is said to have a discontinuous ink coating, considering that it comprises a metallic foil 14 on the surface 14a of which a plurality of ink zones 16 is made at a spacing from each other along a longitudinal direction 18 of the electrode 2. After the calendering step that will be described below, the electrode obtained has metal foil of the order of 10 to 20 µm thick, while the thickness of each ink zone is of the order of 80 to 400 µm. This ink conventionally comprises the constituent ingredients of the electrode 2, namely for example the active material that enables a reaction at this electrode, or a polymer binder and a material that conducts electricity. Therefore, this ink is located on the surface 14a of the foil that is made from a copper or aluminium-based material or from another material, for example carbon foil.

Figure 2B:
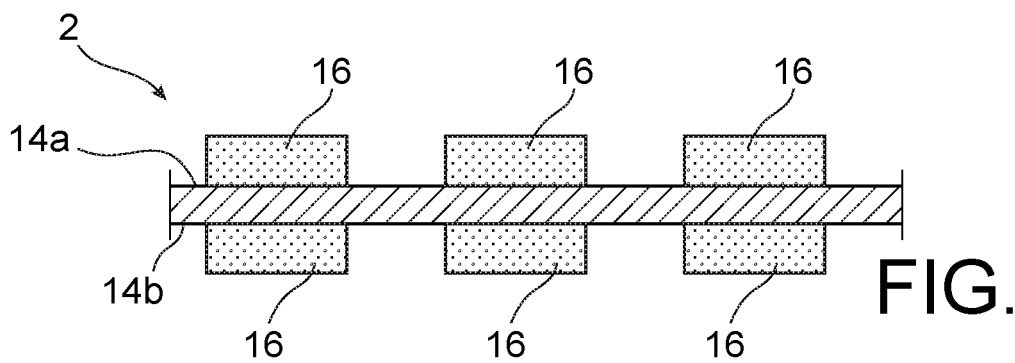
FIG. 2b is a view similar to that 2a, showing an alternative embodiment.

FIG. 2b represents an alternative embodiment in which each of the two opposite surfaces 14a, 14b has a plurality of ink zones 16, these zones preferably arranged symmetrically about a plane defined by the foil. Nevertheless, for reasons of clarity and simplification of the description, the following describes only the embodiment shown in FIG. 2a, on which only one of the two opposite surfaces 14a of the electrode is coated with ink 16.

Figure 3:
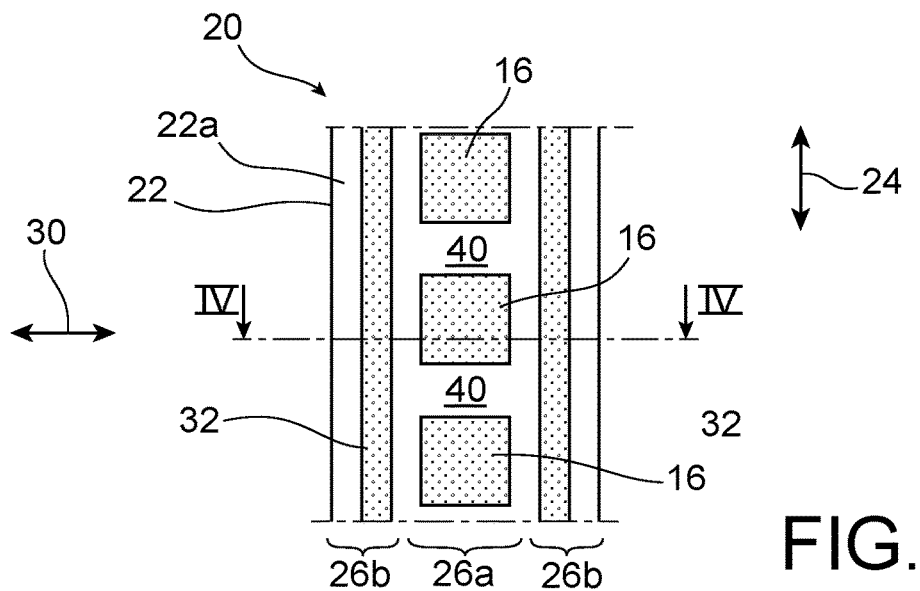
FIG. 3 is a top view of a metallic support coated with ink according to a first preferred embodiment of the invention.
Figure 4:
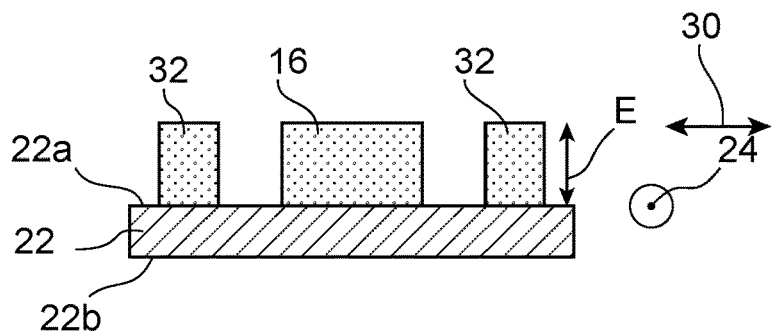
FIG. 4 is a sectional view along line IV-IV in FIG. 3.

Firstly, with reference to FIGS. 3 and 4, a metallic support coated with ink is made, and referred to by the general numeric reference 20. It comprises the support 22 as such, and the ink zones 16 at a spacing from each other along a longitudinal direction 24 of the support 22. These ink zones 16 are made on a first longitudinal segment 26a approximately centred on the support 22. The width of this segment 26a is almost identical to the required electrode width. Consequently, the width of the metallic support 22 along its lateral direction 30 is larger than the required electrode width. Two second segments 26b are provided on each side of the first longitudinal segment 26a, on each of which an additional continuous ink zone 32 is deposited. In this case, each zone 32 is in the form of a strip parallel to the longitudinal direction 24, orthogonal to the lateral direction 30. The width of the additional ink zones 32 in the form of strips is preferably less than the width of the ink zones 16.

Thus, the metallic support 22 is coated on its surface 22a not only by ink zones 16 on the first central segment 26a, but also by additional continuous ink zones 32 on the second segments 26b laterally offset from the first segment. These zones 16, 32 combined form a support coating within which the thickness E of each of these zones is approximately equal, as shown diagrammatically on FIG. 4. It is also noted that the opposite surface 22*b* is coated in a manner similar to the surface 22*a*, when an electrode of the type shown in FIG. 2*b* is required.

As a result of this design, part of each of the additional ink zones 32 within the support coating is located at the side of each recessed zone 40 located longitudinally between two directly consecutive ink zones 16 of the first segment.

Once this metallic support coated with ink 20 has been made, it is calendered within an appropriate calendering device 40. As shown diagrammatically on FIG. 5, in particular this device comprises calendering rolls 42 between which the coated support 20 is moved forwards along an advance direction 44 parallel to the longitudinal direction 24 of the support 22. These two rolls 42 are preferably chrome plated and are capable of applying a high pressure at the passage of the electrode, for example this pressure possibly being as high as 40 tonnes. The resulting compression optimises the characteristics of the battery, such as the energy density or the electrical conductivity. Due to the presence of additional ink zones 32, the separation between the two rolls remains identical at all times during advance of the coated support 20, and even during passage of the recessed zones 40 as shown diagrammatically on FIG. 5. At this instant, the rolls 42 bear on the lateral ends of the coated support 20, on the two ink bands 32. Firstly, this prevents calendering defects at the longitudinal ends of the ink zones 16. But contact of the rolls 42 with the coated support 20 maintains continuity of the advance movement of this support, precisely because contact is maintained between these elements. The calendering rolls 42 are preferably motor driven about their axes perpendicular to the direction of movement 44. The single contact between these rolls 42 and the coated support 20 also moves this support along the longitudinal direction 24.

In this respect, it should be noted that calendering is done continuously, the support output from the rolls 42 can then be wound such that it subsequently be re-unwound and then cut longitudinally. Alternatively, a longitudinal cut can be envisaged directly after a pass through the calendering rolls 42.

Figure 6:
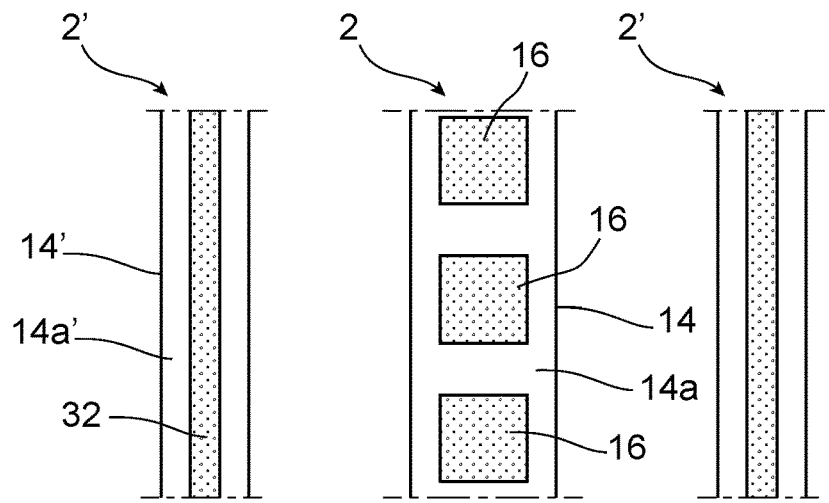
FIG. 6 represents electrodes obtained after separation of support segments obtained by calendering.

After this calendering step, during which the roll 42 on the side of the ink coating is therefore permanently in coating with this moving coating, a step is performed to separate the three segments 26*a*, 26*b*, for example by laser cutting or splitting. As shown diagrammatically on FIG. 6, the electrode 2 shown on FIG. 2*a* is obtained from the first segment. The other two parts obtained from the second segments 26*b* then each form an electrode 2' formed from a foil 14' corresponding to the second support segment 22, coated on its surface 14*a*' with an addition continuous ink zone 32. Therefore, there are two electrodes 2' with a continuous ink coating, that can be used in other batteries. Alternatively, the ink 32 can be removed from the foil 14', for use later in manufacturing other electrodes.

Figure 7:
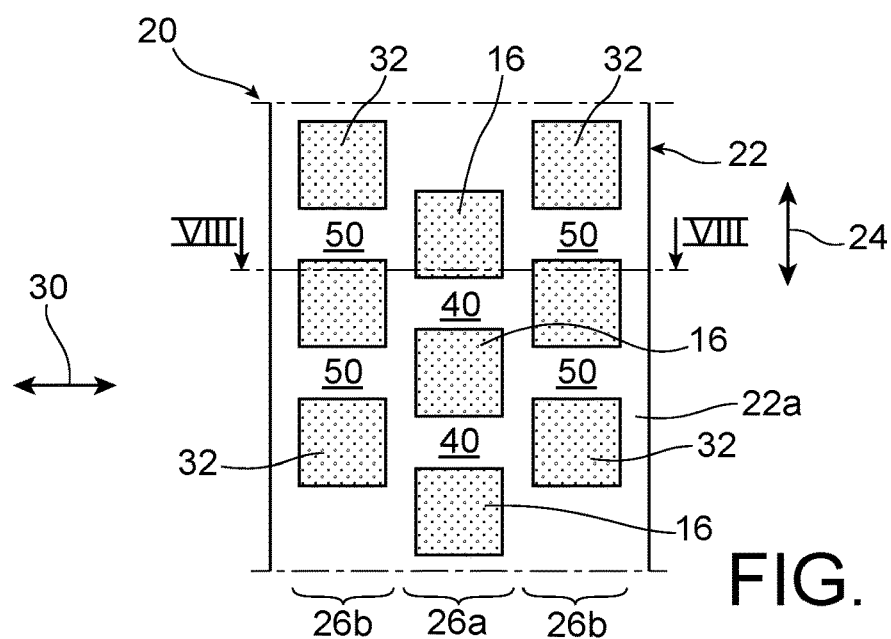
FIG. 7 is a view similar to the view in FIG. 3, according to a second preferred embodiment of the invention.
Figure 8:
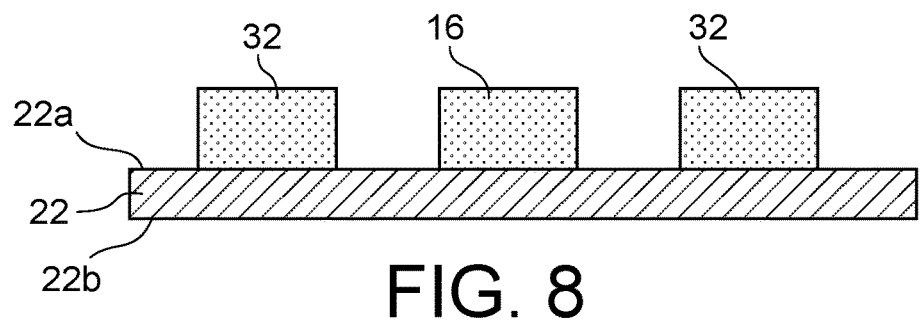
FIG. 8 is a diagrammatic top view of the metallic support coated with ink shown on FIG. 7.

FIGS. 7 and 8 show a second preferred embodiment of the invention in which there are many similarities between the coated metallic support 20 and that described above. In this case, the difference lies in the fact that on the second segments 26*b* located on each side of the first segment 26*a* of the support 22, the ink is no longer deposited continuously and is discontinuous, so as to form several additional ink zones 32 at a longitudinal spacing from each other. Therefore, in this embodiment, the support 22 is formed by three segments 22. However, this number of segments can vary from 2 to a number more than 3, the limit being fixed by the length of the calendering rolls through which this support will advance. For example, the length of this roll may be of the order of 250 mm.

In any case, it is organised such that the support coating composed of the ink zones 16 and the additional ink zones 32 are staggered. The consequence of this is that at least one additional ink zone 32 in each of the second segments 26*b* is located laterally facing each recessed zone 40 located between two directly consecutive ink zones 16. But there is also an ink zone 16 in the first segment located laterally facing each hollow zone 50 located between two additional directly consecutive ink zones 32 within a particular second segment. As also shown on FIG. 7, the staggered arrangement adopted is such that the ink zones 16 and the additional zinc zones 32 overlap partially along the longitudinal direction 24.

Figure 5:
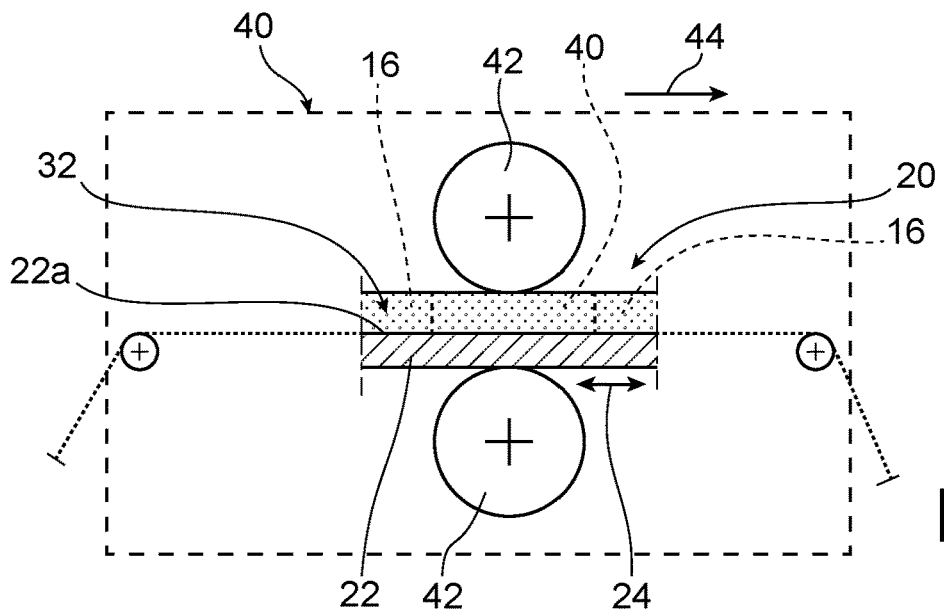
Figure 9:
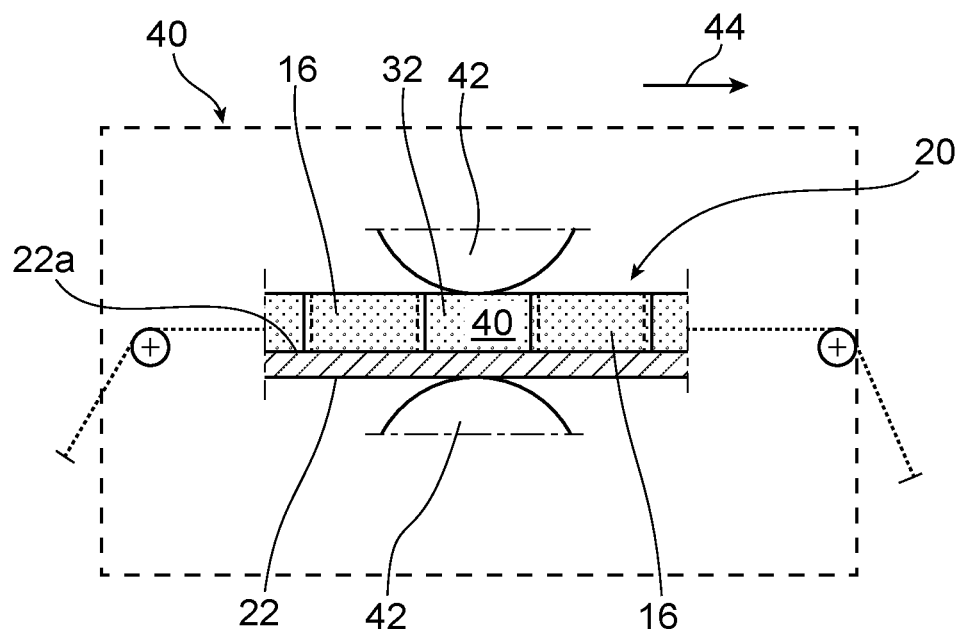
FIG. 9 is a diagrammatic view of a calendering step of the support coated with ink shown on FIGS. 7 and 8.
Figure 10:
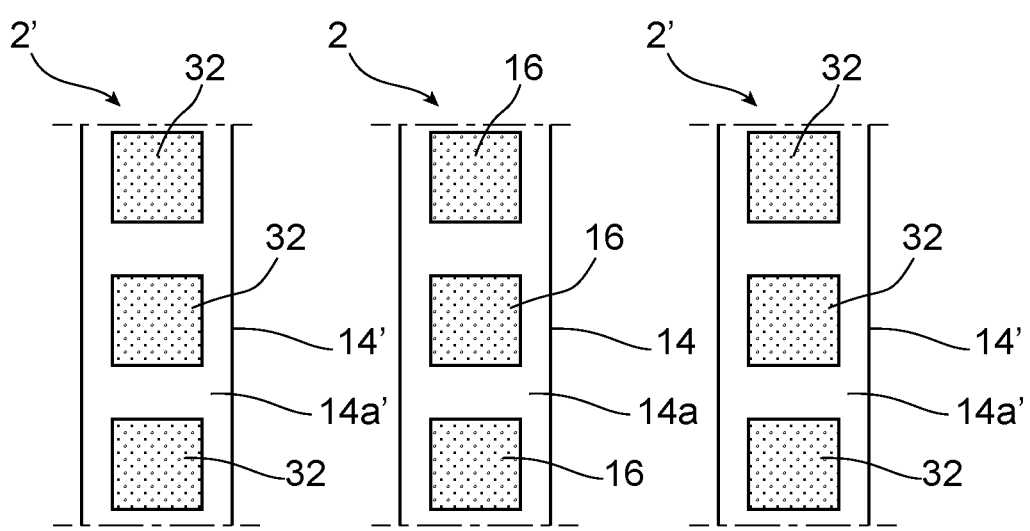
FIG. 10 is a view representing the electrodes obtained after separation of support segments obtained by calendering shown on FIG. 9.

With reference to FIG. 9, a calendering step similar to that described with reference to FIG. 5 for the first preferred embodiment, is then performed. Therefore, the coated support 20 advances along the direction of movement 44, between the rolls 42. Due to the presence of additional ink zones 32, the separation between the two rolls 42 remains constant at all times during advance of the support, even during passage of the recessed zones 40 as shown diagrammatically on FIG. 9. At this moment, the spacing between the two rolls 42 is maintained by contact between the upper roll 42 and the two additional ink zones 32 located laterally relative to the recessed zone 40 passing through the rolls 42.

As for the first embodiment described above, a step to separate the segments is then performed in order to form the electrode 2 through the first segment, and to form two electrodes 2' each obtained from one of the second segments 26*b*. Note that in this case, each of the electrodes 2' has a discontinuous ink coating formed from the additional ink zones 32 on the surface 14*a*' of the foil 14'. Consequently, the design of the two electrodes 2' derived from the two segments 26*b* can be the same as the design of the electrode 2, and therefore they form electrodes for the manufacture of similar batteries.

Figure 11:
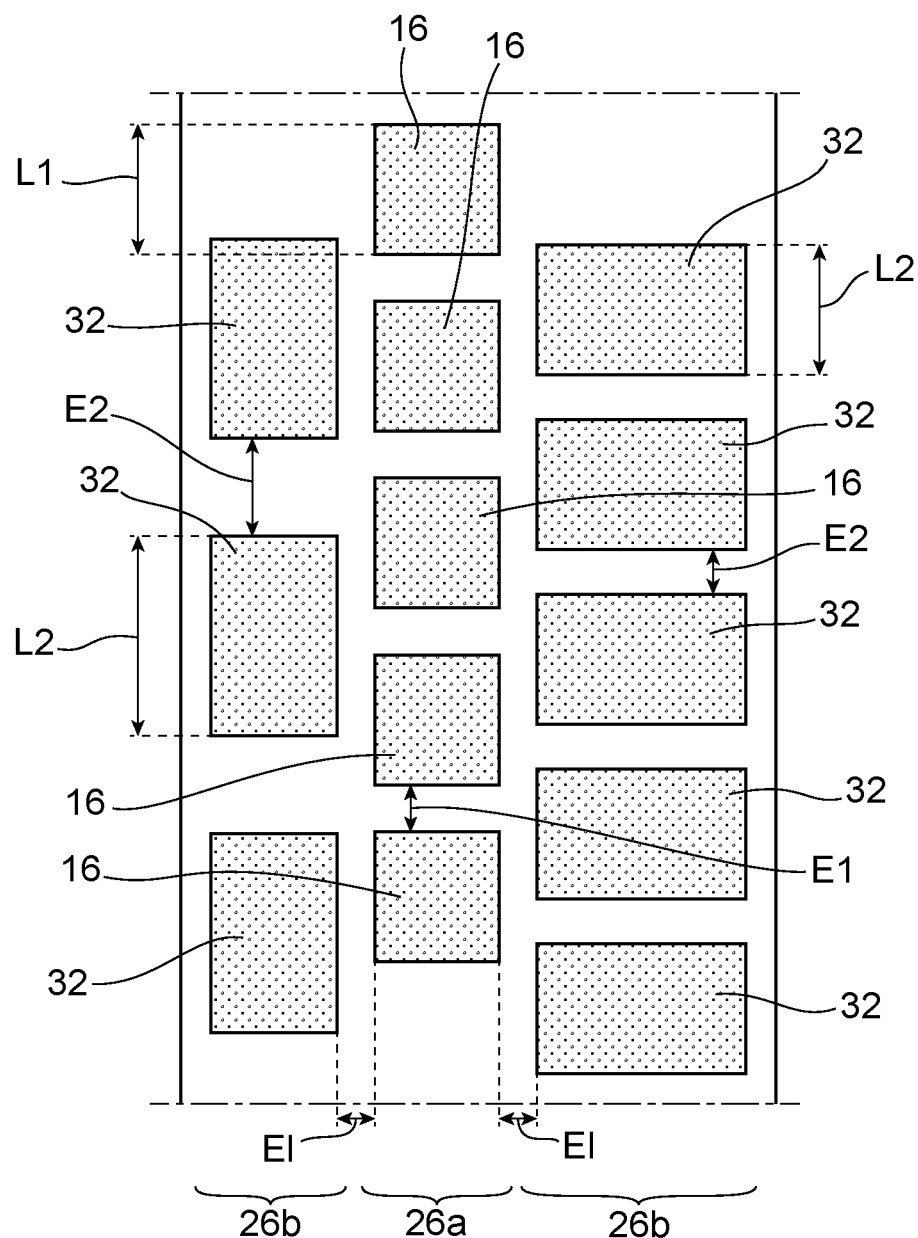
FIG. 11 is a view similar to the view in FIG. 7, according to yet another preferred embodiment of the invention.

According to another different embodiment shown diagrammatically in FIG. 11, it can be seen that the shapes and dimensions of the additional ink zones 32 coated on the second segments 26*b* may be different from the shapes and dimensions of the ink zones 16 of the first segment. In particular, the longitudinal extent L1 of the ink zones 16 can be different from the longitudinal extent L2 of the additional ink zones 32. Similarly, the longitudinal extent L2 of each additional ink zone 32 may be different within the two segments 26*b*. The same applies for the space E1 between the ink zones 16, and the space E2 between the additional ink zones 32 of each of the two segments 26*b*.

Finally, and still with reference to FIG. 11, note that the ink zones 16 in the first segment 26*a* are at a lateral spacing from the additional ink zones 32 of each second segment 26*b*, a non-zero lateral spacing E1 being adopted between these assemblies of ink zones.

Obviously, an expert in the subject can make various modifications to the invention as it has just been described through non-limitative examples.

The invention claimed is:

1. Method of manufacturing at least one electrode for a battery with a discontinuous ink coating, said electrode comprising a metal foil coated with a plurality of ink zones at a spacing from each other along a longitudinal direction of the electrode on at least one of its two opposite surfaces, the method comprising the following steps:
   make ink zones on a first longitudinal segment of a metallic support wider than the foil of the electrode to be manufactured, and make at least one additional ink zone on at least one second longitudinal segment of the support offset from the first segment along a lateral direction of the support, the assembly composed of the ink zones of the first segment being laterally spaced from the assembly formed by each additional ink zone of at least one second segment directly consecutive to it along the lateral direction, the ink zones and each additional ink zone jointly forming a support coating on one of the two opposite faces of the support, such that at least one additional ink zone of a second segment laterally faces each recessed zone located between two directly consecutive ink zones of the first segment and wherein a non-zero spacing in the lateral direction is formed between the ink zones and each additional ink zone;

calendering of the metallic support provided with its coating, by movement between the calendering rolls along a longitudinal direction of the support orthogonal to its lateral direction, the calendering roll located on the side of the support coating being permanently in contact with this coating during calendering; and separation of the segments so as to obtain the electrode through the first segment, and at least one other electrode through at least one of the second segments.

2. Method according to claim 1, wherein at least one second support segment is coated with an additional continuous ink zone along the longitudinal direction of the support.

3. Method according to claim 2, wherein two second support segments are located one on each side of the first segment, and in that each of the two second segments is coated with an additional continuous ink zone along the longitudinal direction of the support.

4. Method according to claim 2, wherein at least one of the second segments forms another electrode with a continuous ink coating.

5. Method according to claim 1, further comprising coating at least one second support segment with a plurality of additional ink zones at a spacing from each other along the longitudinal direction of the support.

6. Method according to claim 5, wherein several second support segments are located one on each side of the first segment, and in that each of the second segments is coated with a plurality of additional ink zones at a spacing from each other along the longitudinal direction of the support.

7. Method according to claim 5, wherein the ink zones and the additional ink zones are staggered on the support, and/or in that the assembly formed by the ink zones of the first segment is identical to the assembly formed by the additional ink zones of at least one second segment directly consecutive to it along the lateral direction.

8. Method according to claim 5, wherein a longitudinal extent of the ink zones is different from longitudinal extent of the additional ink zones of at least one of the second segments, and/or in that a space between two directly consecutive ink zones is different from a space between two additional directly consecutive ink zones of at least one of the second segments.

9. Method according to claim 5, wherein after said segment separation step, at least one of the second segments forms another electrode with a discontinuous ink coating.

10. Method according to claim 1, wherein the support is made from a copper or aluminium-based material or from carbon foil.

11. Method according to claim 1, wherein during the calendering step, the support coated with ink is advanced by contact between the support and the calendering rolls driven in rotation.

12. Method according to claim 1, wherein a thicknesses of the ink zones and of the additional ink zones of the support coating are identical.

13. Method according to claim 1, wherein the other of the two opposite faces of the metallic support is also coated with ink zones and at least one additional ink zone.

14. Metallic support for an ink coating for use for manufacturing at least one electrode for a battery with a discontinuous ink coating, said electrode being designed to include a metal foil coated with a plurality of ink zones at a spacing from each other along a longitudinal direction of the electrode on at least one of its two opposite surfaces, wherein it comprises a metallic support coated on at least one of its two opposite surfaces with:

ink zones on a first longitudinal segment of the support;

at least one additional ink zone on at least one second longitudinal segment of the support offset from the first segment along a lateral direction of the support, the ink zones and each additional ink zone jointly forming a support coating arranged such that at least one additional ink zone of a second segment is located laterally facing each recessed zone formed between two directly consecutive ink zones of the first segment and wherein a non-zero spacing in a lateral direction is formed between the ink zones and each additional ink zone, and in that the assembly formed by the ink zones of the first segment is laterally spaced from the assembly formed by each additional ink zone of at least one second segment directly consecutive to it along the lateral direction.

* * * * *